United States Patent [19]
Klomp et al.

[11] Patent Number: 5,460,728
[45] Date of Patent: Oct. 24, 1995

[54] METHOD FOR INHIBITING THE PLUGGING OF CONDUITS BY GAS HYDRATES

[75] Inventors: Ulfert C. Klomp, Amsterdam, Netherlands; Vitold R. Kruka, Houston, Tex.; Rene Reijnhart; Anton J. Weisenborn, both of Amsterdam, Netherlands

[73] Assignee: Shell Oil Company, Houston, Tex.

[21] Appl. No.: 171,544

[22] Filed: Dec. 21, 1993

[51] Int. Cl.$^6$ .................................................. C02F 5/12
[52] U.S. Cl. ..................... 210/698; 252/70; 252/71; 252/77; 585/15; 585/899; 585/950
[58] Field of Search ......................... 210/696, 698, 210/701; 585/4, 15, 800, 899, 950; 252/70, 71, 77

[56] References Cited

U.S. PATENT DOCUMENTS

| | | | |
|---|---|---|---|
| 3,644,107 | 2/1972 | Clark | 48/190 |
| 3,676,981 | 7/1972 | Afdahl et al. | 55/30 |
| 3,857,686 | 12/1974 | Arnold et al. | 252/79 |
| 4,256,282 | 3/1981 | Goldschild et al. | 251/58 |
| 4,456,067 | 6/1984 | Pinner, Jr. | 166/279 |
| 4,915,176 | 4/1990 | Sugier et al. | 166/371 |
| 5,076,364 | 12/1991 | Hale et al. | 166/310 |
| 5,127,231 | 7/1992 | Larue et al. | 62/20 |
| 5,331,105 | 7/1994 | Duncum et al. | 585/800 |

FOREIGN PATENT DOCUMENTS

| | | |
|---|---|---|
| 0309210A1 | 3/1989 | European Pat. Off. |
| WO93/25798 | 12/1993 | WIPO |

OTHER PUBLICATIONS

J. H. van der Walls and J. C. Platteeuw, "Clathrate Solutions," Advances in Chemical Physics, 2:1–57 (1959).
Arthur L. DeVries, "Biological Antifreeze Agents in Coldwater Fishes," Comparative Biochemistry and Physiology, vol. 73A, No. 4, 627–640 (1982).
F. Franks, J. Darlington, T. Schenz, S. F. Mathias, L. Slade, and H. Levine, "Antifreeze Activity of Antarctic Fish Glycoprotein and a Synthetic Polymer," Nature, vol. 325, 146–147 (Jan. 8, 1987).
Robin L. Sutton, "Critical Cooling Rates to Avoid Ice Crystallization in Aqueous Cryoprotectant Solutions Containing Polymers," J. Chem. Soc. Faraday Trans. 1991, 87(23), 3747–3751.
K. H. Ziller and H. H. Rupprecht, "Control of Crystal Growth in Drug Suspensions," from the Department of Pharmaceutical Technology, University of Regensburg, Federal Republic of Germany, Pharm. Ind. 52, Nr. 8, 1017–1022 (1990).

*Primary Examiner*—Neil McCarthy

[57] ABSTRACT

A method is provided for inhibiting the formation of hydrates in streams containing low-boiling hydrocarbons and water. The method includes adding to the stream a component of the formula:

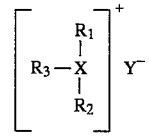

wherein
$R_1$, $R_2$, and $R_3$ are independently chosen from the group consisting of normal and branched alkyls having at least 4 carbon atoms,
and X is N—$R_4$, wherein $R_4$ is selected from the group consisting of hydrogen and organic substituents and
$Y^-$ is an anion. The amount added is an amount that is effective to inhibit formation of hydrates in the mixture at conduit temperatures and pressures. The preferred $R_4$ is an alkyl or alkenyl having from eight to twenty carbons, and the preferred $R_1$, $R_2$, and $R_3$ are alkyls having four to six carbon atoms.

14 Claims, 1 Drawing Sheet

FIG.1A
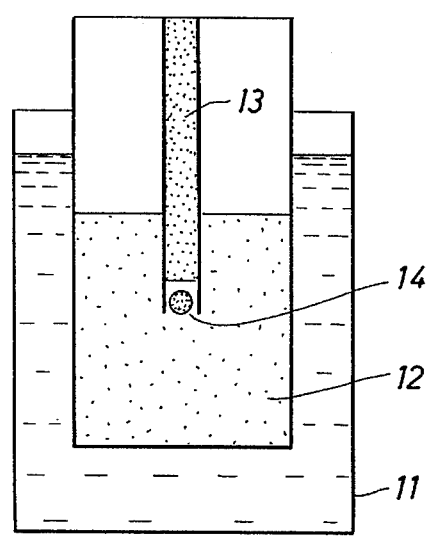
FIG.1B
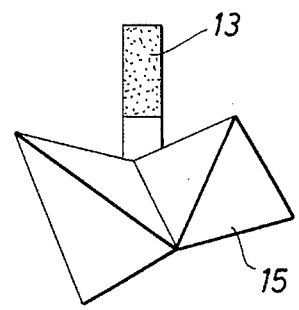
FIG.1C
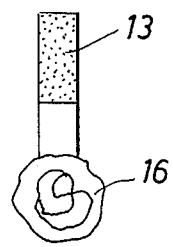
FIG.2
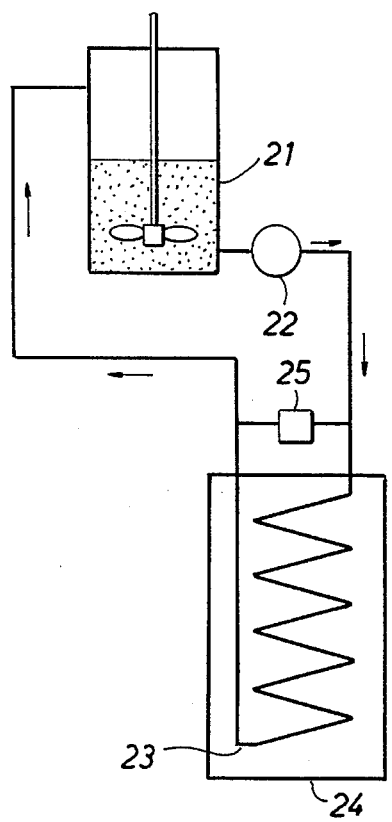
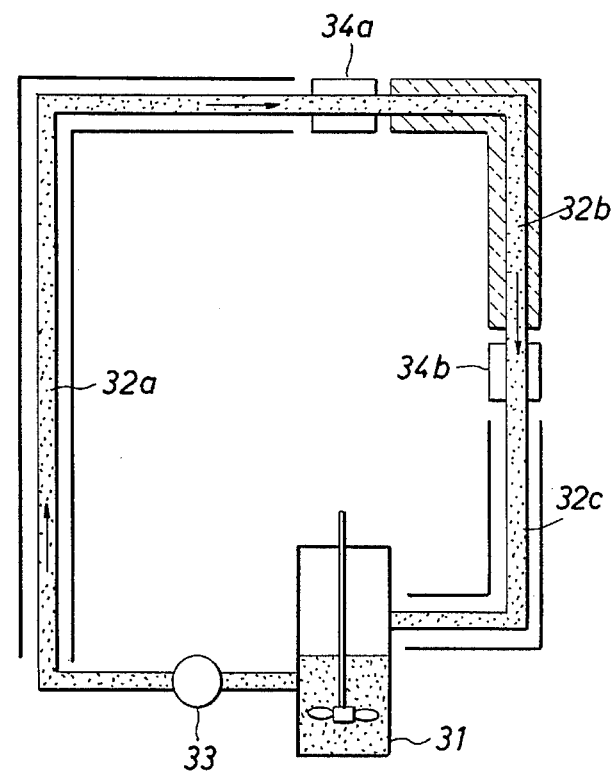
FIG.3

METHOD FOR INHIBITING THE PLUGGING OF CONDUITS BY GAS HYDRATES

FIELD OF INVENTION

This invention relates to a method for inhibiting the plugging by gas hydrates of conduits containing a mixture of low-boiling hydrocarbons and water.

BACKGROUND OF THE INVENTION

Gas hydrates are clathrates (inclusion compounds) of gases in a lattice consisting of water molecules.

Low-boiling hydrocarbons, such as methane, ethane, propane, butane and iso-butane, are present in natural gas and also in crude oil. Because water may also be present in varying amounts in natural gas and crude oil, the mixture, under conditions of elevated pressure and reduced temperature, tends to form gas hydrate crystals. The maximum temperature at which gas hydrates can be formed strongly depends on the pressure of the system. For example, ethane at a pressure of approximately 1MPa can form hydrates only at temperatures below 4° C. whereas at a pressure of 3 MPa stable hydrates can be present at temperatures as high as 14° C. With respect to this strong dependence of the hydrate melting point on pressure, hydrates markedly differ from ice. As described by M. von Stackelberg and H. R. Muller (Z. Electrochem. 1954 5825), methane and ethane hydrates form cubic lattices having a lattice constant of 1.2 nm (hydrate structure I). The lattice constant of the cubic propane and butane gas hydrates is 1.73 nm (hydrate structure II). However, the presence of even small amounts of propane in a mixture of low-boiling hydrocarbons will result in the formation of gas hydrates having structure II (J. H. van dor Waals and J. C. Platteeuw, Adv. Chem. Phys. 2 1959 1).

It has been known for a long time, that gas hydrate crystals, when allowed to form and grow inside a conduit such as a pipeline, tend to block or even damage the conduit. To prevent such blocking, the following thermodynamic measures are possible in principle: removal of free water, maintaining elevated temperatures and/or reduced pressures or the addition of melting point depressants (antifreeze). In practice, the last-mentioned measure is most frequently applied. However, the antifreeze, such as the lower alcohols and glycols, have to be added in substantial amounts (several tens of percent by weight of the water present) to be effective. An additional disadvantage of such amounts is that recovery of the antifreezes is usually required during further processing of the mixture.

An attractive alternative to the anti-hydrate measures described above, particularly the antifreezes, is to use a crystal growth inhibitor. The principle of interfering with crystal growth is known.

Plants and poikilothermic animals such as insects and cold-water fish are known to protect themselves from freezing, both by antifreezes such as glycols and by special peptides and glycopeptides (termed Antifreeze Proteins, AFP's and Antifreeze Glycoproteins, AFGP's) which interfere with ice crystal growth (A. L. de Vries, Comp. Biochem. Physiol, 73 1982 627). The present applicants found such cold-water fish peptides and glycopeptides also to be effective in interfering with the growth of gas-hydrate crystals. However, their production and use for this purpose are currently considered to be uneconomical.

In PCT Patent Application EP93/01519, the use of polymers and copolymers of N-vinyl-2-pyrrolidone for inhibiting the formation, growth and/or agglomeration of gas hydrate crystals is disclosed.

It is therefore an object of the present invention to provide a method to inhibit formation of hydrates in streams containing at least some light hydrocarbons and water. It is a further object to provide such a method wherein a high concentration of additive is not required.

SUMMARY OF THE INVENTION

It has now been found that certain alkylated ammonium, phosphonium or sulphonium compounds are very effective, in relatively low concentrations, in interfering with the growth of gas hydrate crystals, and therefore that they can be very useful in inhibiting the plugging by gas hydrates of conduits containing low-boiling hydrocarbons and water. The subject compounds have three or four alkyl groups in their molecule, at least three of which are independently chosen from the group of normal or branched alkyls having four to six carbon atoms.

These and other objects are therefore accomplished by a method for inhibiting the plugging of a conduit, the conduit containing a flowing mixture comprising an amount of hydrocarbons having from one to five carbons and an amount of water wherein the amounts of hydrocarbons and water could form hydrates at conduit temperatures and pressures, the method comprising the steps of:

adding to the mixture an amount of a hydrate formation inhibitor component of the formula

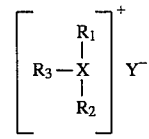

wherein $R_1$, $R_2$, and $R_3$ are independently chosen from the group consisting of normal and branched alkyls having at least 4 carbon atoms, X is selected from the group consisting of S, N—$R_4$, and P—$R_4$, $R_4$ is selected from the group consisting of hydrogen and organic substituents and $Y^-$ is an anion, the amount effective to inhibit formation of hydrates in the mixture at conduit temperatures and pressures; and flowing the mixture containing the hydrate formation inhibitor through the conduit.

Ammonium (X is N—$R_4$) and phosphonium (X is P—$R_4$) alkylated compounds according to the invention are preferred. As indicated above, $R_4$ can be very broadly chosen. $R_4$ may also contain one or more heteroatoms, such as oxygen. More in particular $R_4$ can be chosen from the group of alkyls, alkenyls, aryls, arylalkyls, arylalkenyls, alkylaryls, alkenylaryls and glycols having from 1 to 20 carbon atoms.

Preferred are ammonium or phosphonium alkylated compounds according to the invention wherein $R_4$ is an alkyl or alkenyl group having from 8 to 20 carbon atoms.

The alkylated compounds according to the invention can be chemically bound through their $R_4$ group to polymers. They then are branches of these polymers. Examples of polymers to which the alkylated compounds according to the invention can be suitably bound are polyacrylic acid, and polymers and copolymers of N-vinyl- 2-pyrrolidone.

$R_1$, $R_2$ and $R_3$ of the alkylated compounds according to the invention are preferably independently chosen from the group of n-b iso-pentyl and n-pentyl.

Particularly preferred cations of the alkylated compounds of the invention are those of tributyldecylammonium, tripentyldecylammonium, tributylhexadecylammonium and tributylhexadecylphosphonium.

BRIEF DESCRIPTION OF THE DRAWINGS

FIGS. 1A, 1B and 1C are schematic drawings of the apparatus used to perform Example 1.

FIG. 2 is a schematic drawing of the apparatus used to perform Example 3.

FIG. 3 is a schematic drawing of the apparatus used to perform Example 4.

DETAILED DESCRIPTION OF THE INVENTION

The anions of the alkylated compounds according to the invention can be broadly chosen. Preferred anions are the hydroxide, carboxylates, halides, sulphates and organic sulphonates.

In the case of the ammonium or phosphonium alkylated compounds according to the invention having three alkyl groups as defined hereinabove, the fourth group attached to the nitrogen or phosphorus atom can be broadly varied without significantly altering the hydrate growth inhibiting properties of these compounds, whereby additional advantages can be achieved by the fourth group. Examples of such fourth groups are long alkyl or alkenyl chains, in particular oleyl, or groups attached to polymers. Exemplary of such polymers wherein the subject compounds can be incorporated by their fourth group are polyacrylic acid, and the polymers and copolymers of N-vinyl-2-pyrrolidone.

When the fourth group $R_4$ of an alkylated compound according to the present invention is a longer alkyl or alkenyl chain (e.g. one containing more than 12 carbon atoms), its surface active properties may give the subject compound, in addition to its inherent hydrate crystal growth-inhibiting properties, the following very important additional advantages:

Emulsify the aqueous into the hydrocarbon phase (W/O emulsion), thereby keeping the concentration of water available for hydrate forming at the conduit wall small.

Concentrate the subject compound near the water-hydrocarbon interfaces, where hydrate formation is most pronounced, thereby raising the local concentration of ions to freezing-point depressing level.

Modify the structure of water near the hydrocarbon-water interface in such a way that the formation of hydrate crystals is hindered.

Impede further access of water molecules to the hydrate crystal after attachment of the subject compound to the hydrate crystals.

Prevent agglomeration of hydrate crystals by making their surface hydrophobic.

Adhere the subject compound to the conduit wall, thereby preventing the adhesion of hydrates thereto.

The amount of the alkylated compounds used in the process according to the invention is generally between 0.05 and 5 wt %, preferably between 0.1 and 0.5 wt %, based on the amount of water in the hydrocarbon-containing mixture.

It will be understood that the compounds used have to be soluble in water at the concentration required and at a temperature of about 5° C.

The alkylated compounds according to the invention can be prepared in manners which are known in the art, from ingredients which are simple and abundantly available.

The alkylated compounds according to the invention can be added to the subject mixture of low-boiling hydrocarbons and water as their dry powder or, preferably, in concentrated solution.

The alkylated compounds according to the present invention can be used together with the polymers and copolymers of N-vinyl- 2 -pyrrolidone which are the subject of the aforementioned PCT Patent Application No. EP 93/01419, and the combined effect is at least additive. The latter are preferably added to an amount of between 0.05 and 4 wt %, based on the water content.

The following Examples will illustrate the invention.

EXAMPLE 1

In this screening example, an aqueous solution of tetrahydrofurane (THF) was used as a model for wet gas, since tetrahydrofurane in water is known to form hydrate (structure II) crystals at about the same temperature as wet gas, but already at atmospheric pressure—for example, an 18.9 wt % aqueous solution of THF has a hydrate melting point of 4.3° C. at atmospheric pressure.

The effect of different additives on the growth of a single hydrate crystal was studied by adding 0.5 wt % (based on the total amount of liquid) of an additive to a solution of 18.9 wt % THF in water (approx. molar ratio 1:17), also containing 3 wt % of NaCl, and performing the experiments described below.

A glass vessel, open to atmospheric pressure and containing the solution to be tested is immersed in a thermostatically controlled bath. After thermal equilibrium has been reached, a capillary holding a small ice crystal (about 0.1 gram) is introduced into the solution. In the reference solution, not containing the additives according to the invention, this introduction of a small ice crystal needs the growth of large type II hydrate crystals which are easy to inspect visually. The morphology and weight of the hydrate crystals formed during the 180 minutes at 0° C. after the introduction of the capillary into the different solutions are determined and compared.

It was observed, that under the above experimental conditions hydrate crystals grown in the reference solution (not containing additives) had a distinct and regular appearance. At the beginning of crystal growth geometrically perfect hexagonal plates were frequently observed, while at later stages the crystals acquired pyramidal shapes, the angles between the faces of the pyramids being 70.9 (±1.9) degrees. In all cases flat crystal planes intersected in sharp angles.

By contrast, the addition of 0.5 wt % of several of the ammonium or phosphonium salts mentioned hereafter, resulted under the above experimental conditions in the growth of severely deformed and much smaller hydrate crystals. Addition of the most active of these salts resulted in the formation of crystals having the appearance of a sheet of paper crushed into a ball, whereas other salts induced the formation of hydrate crystals exhibiting rounded edges between the crystal planes, sometimes to such an extent that flat crystal faces were barely visible.

The experimental set-up is shown schematically in FIG. 1A, FIG. 1B, and FIG. 1C, wherein 11 is the thermostatically controlled bath, 12 the solution to be tested, 13 the capillary, 14 the ice crystal seed, 15 a hydrate crystal grown in the THF/NaCl solution without additive and 16 a hydrate crystal grown in the THF/NaCl solution containing an effective additive.

Table 1 presents the results of a series of experiments 1.1–1.41, whereby 0.5 wt % of additives according to the invention were added, and comparative experiments 1.42–1.44. After 180 minutes at 0° C., the crystals were weighed and their general appearance was classified as follows:

RP=Regular Pyramids
CS=Crumbled Sheet
RE=Rounded Edges

TABLE 1

| Ex. | Appearance | Crystals Weight | Appearance |
|---|---|---|---|
| 1.1 | tetrapentylammoniumbromide | <0.1 grams | CS |
| 1.2 | tripentylbutylammoniumbromide | <0.1 grams | CS |
| 1.3 | triisopentybutylammoniumbromide | <0.1 grams | CS |
| 1.4 | triisopentylammoniumsulphate | 0.1 grams | RE |
| 1.5 | tetrabutylphosphoniumchloride | 0.1 grams | RE |
| 1.6 | tributyldecylammoniumbromide | 0.4 grams | RE |
| 1.7 | tributylisopentylammoniumbromide | 0.6 grams | RE |
| 1.8 | tripentylammoniumsulphate | 0.8 grams | RP |
| 1.9 | tributyltetradecylammoniumbromide I | 0.8 grams | RE |
| 1.10 | tributylpentylammoniumbromide | 0.9 grams | RP |
| 1.11 | tributyltetradecylammoniumbromide II | 1.0 grams | RE |
| 1.12 | tetrabutylammoniumbromide | 1.1 grams | RE |
| 1.13 | tetrabutylammoniumchloride | 1.2 grams | RE |
| 1.14 | tributyltetradecylammoniumbromide III | 1.4 grams | RE |
| 1.15 | tributylhexadecylphosphoniumbromide | 1.7 grams | CS |
| 1.16 | tetrabutylammonium-toluene-4-sulfonate | 1.9 grams | RE |
| 1.17 | tributylammoniumsulphate | 2.2 grams | RP |
| 1.18 | trihexylbutylammoniumbromide | 2.3 grams | RP |
| 1.19 | dibutypentylethanolammoniumbromide | 2.4 grams | RP |
| 1.20 | tributylheptylammoniumbromide | 2.6 grams | RP |
| 1.21 | tetrahexylammoniumbenzonate | 3.8 grams | RP |
| 1.22 | tetrahexylammoniumbromide | 4.4 grams | RP |
| 1.23 | tributylmethylammoniumbromide | 4.7 grams | RP |
| 1.24 | dibutyldodecylethanolammoniumbromide | 4.9 grams | CS |
| 1.25 | tetrahexylammoniumchloride | 5.7 grams | RP |
| 1.26 | triisobutylpentylammoniumbromide | 7.0 grams | RP |
| 1.27 | (3-dimethylaminopropyl)triphenylphosphoniumbromide | 7.0 grams | RP |
| 1.28 | dipentylammoniumsulphate | 7.4 grams | RP |
| 1.29 | tetramethylammoniumbromide | 7.4 grams | RP |
| 1.30 | methyltriphenylphosphoniumbromide | 8.0 grams | RP |
| 1.31 | tetradecyltrimethylammoniumbromide | 9.9 grams | RP |
| 1.32 | butyltriphenylphosphoniumbromide | 10.4 grams | RP |
| 1.33 | tetrapropylammoniumbromide | 10.7 grams | RP |
| 1.34 | propyltriphenylphosphoniumbromide | 11.6 grams | RP |
| 1.35 | tetraphenylphosphoniumbromide | 12.0 grams | RP |
| 1.36 | tetraethylammoniumbromide | 12.1 grams | RP |
| 1.37 | dodecyltrimethylammoniumbromide | 12.3 grams | RP |
| 1.38 | 2-dimethylaminoethyl-triphenyl phosphoniumbromide | 13.9 grams | RP |
| 1.39 | ethyltriphenylphosphoniumbromide | 14.0 grams | RP |
| 1.40 | ethylhexadecyldimethylammoniumbromide | 15.9 grams | RP |
| 1.41 | octadecyltrimethylannoniumbromide | 17.4 grams | RP |
| 1.42 | no additive I | 12.3 grams | RP |
| 1.43 | no additive II | 13.2 grams | RP |
| 1.44 | no additive III | 14.2 grams | RP |

In the above results, the additives resulting in crystals having a weight of less than 3.0 grams and having a "crumbled sheet" (CS) appearance or "rounded edges" (RE) were considered to be particularly effective. From the results of Example 1, it can be seen that experiments 1.36 through 1.41 compounds were tested that did not have alkyl groups within the scope of the present invention, and these in particular resulted in crystals of a weight similar to experiments 1.42 through 1.44 in which no additive was used.

EXAMPLE 2

Field flow conditions were simulated in an experimental set-up as schematically shown in FIG. 2, comprising a two-liter stirred high-pressure autoclave (21) connected via a gear pump (22) to a coiled copper pipeline (23) of 16 m length and 6 mm internal diameter which is immersed in a thermostatically controlled bath (24). The pressure difference between the inlet and outlet of the pipeline is continuously monitored by a differential pressure transmitter (25).

The autoclave was loaded at 13° C. with 400 ml of synthetic sea water (composed of 24.66 g NaCl, 11.33 g $MgCl_2$, $6H_2O$, 4.16 g $Na_2SO_4$, 1.13 g $CaCl_2$, 0.78 g KCl and 0.09 g NaBr per liter of demineralized water) and with 800 of a typical gas condensate having the following composition:

- 0.02 mol % propane
- 2.41 mol % iso-butane
- 9.92 mol % n-butane
- 7.70 mol % iso-pentane
- 7.58 mol % n-pentane
- 14.07 mol % n-hexane
- 14.60 mol % fraction boiling between 70°–100° C. (major components methycyclopentane, benzene, cyclohexane, n-heptane, methylcyclohexene, toluene, and ethylcyclopentane)
- 22.45 mol % fraction boiling between 100°–150° C. (major components n-heptane, methlcyclohexane, toluene, ethylcyclohexane, octane, ethylbenzene, propylcyclohexane, xylene (P, M, O), nonane, decane, propylbenzene)
- 11.74 mol % fraction boiling between 150°–215° C. (major components include decane and undecane)
- 9.54 mol % fraction boiling above 215° C.

In addition, the autoclave was loaded with ethane until the pressure (at the starting temperature, 13° C.) within the autoclave was 2 MPa. After loading and closing the autoclave, the stirred mixture was circulated through the system at a rate of 6.1 liters/hour. The temperature of the bath was lowered gradually, at a rate of 5° C. per hour, either until the pressure drop between the inlet and outlet of the coiled pipeline exceeded 0.1 MPa (at which stage the loop was considered to be blocked and the experiment terminated) or down to a pre-set minimum temperature of 0.5 ° C. or minus 1° C. If the loop did not block during the cooling stage, the circulation of the mixture was continued at the pre-set minimum value until plugging occurred. To initiate the formation of hydrates, a piece of dry ice (solid $CO_2$) was held against the inlet of the coiled pipeline. During the gradual cooling stage the pressure drop over the coiled pipeline and the temperature of the bath were continuously monitored as a function of time.

Without any additive, the pressure over the loop gradually increased until the pipeline blocked when the temperature of the bath reached 6° C.

When 0.5 wt % of the additive tributyltetradecylammoniumbromide was added to the condensate-water mixture, the pipe reached the pre-set minimum temperature of 0.5° C. after which the mixture was circulated for another five hours before the pipeline suddenly blocked.

When 0.25 wt % tetrapentylammoniumbromide and 0.25 wt % "GAFFIX" is added to the condensate-water mixture, the loop reached the pre-set temperature of −1° C., after which the mixture circulated for another 9 hours before the pipeline blocked. Again, no steady increase of the pressure drop was observed prior to blockage.

EXAMPLE 3

The experimental setup was as in Example 2, except that 200 ml of a 7 wt % aqueous solution of NaCl was used instead of 400 ml of synthetic sea water.

Without any additives, the pressure drop over the pipeline gradually increased until the loop blocked when a temperature of 4.2° C., was reached.

When 0.5 wt % of tributylehexadecylphosphoniumbromide is added to the 200 ml of water containing the 7 wt % of sodium chloride, the loop reached the pre-set temperature of −2° C., after which the mixture was circulated for another 50 hours before the pipeline blocked.

EXAMPLE 4

In this example, field conditions were simulated by using equipment as is shown schematically in FIG. 3. The set-up comprises a mixing tank (31), a stainless steel pipeloop having an inner diameter of 19 mm (32a–c), and a gear pump (33) for circulating a hydrate forming mixture of water and liquid hydrocarbons through the loop.

The part of the loop in which the formation and transport of gas hydrates under conditions of turbulent flow is studied is divided in three sections: The first section (32a) has a length of 72 meters and is surrounded by a coaxial pipe through which a temperature-controlled liquid is circulated in a direction opposite to that of the flowing hydrate forming mixture. The second section (32b) has a length of 24 meters and is thermally insulated. The last section (32c) has a length of 12 meters and is also surrounded by a coaxial pipe through which a temperature-controlled liquid is circulated in counterflow to the hydrate forming medium. The pressure drop over 9 consecutive parts of the pipeloop, each having a length of 12 meters, is measured by means of differential pressure meters. Thermometers are placed at intervals of 12 meters to monitor the temperature of the hydrate forming medium along the loop. Finally, two viewing windows (34a and 34b) are mounted near the inlet and outlet of the second section (32b) to allow visual observation of the hydrate forming mixture.

For each experiment the instrument was loaded with a hydrate forming medium, consisting of 5 liters of water, 7.6 kilograms of ethane and 50 liters of "SHELLSOL D60" (trade name for a mixture of paraffinic and naphthenic hydrocarbons, mainly in the $C_{10}$–$C_{12}$ range, available from Shell Oil Company, Houston, Tex.

Prior to the start-up of the experiment, the hydrate forming medium was circulated through the loop at a rate of 510 liters per hour. During this period the temperature of the liquids flowing through the coaxial pipes surrounding the first and third sections was continuously adjusted until the temperature of the hydrate forming medium was, at every point along the loop, 16° C. The pressure drop over the length of the pipe at this pre-experimental steady state was 25 kPa.

In the actual experiment the temperature of the liquid surrounding the first section (32a) was lowered continuously so as to cause the temperature $T_1$ of the hydrate forming medium at the end of the second section (32b) to be lowered by 1.0° C. per hour. Simultaneously the temperature of liquid surrounding the third section (32a) was increased to ensure that the hydrate forming mixture re-enters the first section at a constant temperature of 16° C. In this mode of operation the temperature of the hydrate forming medium rapidly drops over the first 36 meters of the loop after which it becomes practically constant and identical to $T_1$ for another 60 meters before it rises to 16° C. in the last section.

Hydrate formation was triggered by cooling 1 $cm^2$ of the inner surface of the first section, halfway its length, to a constant temperature of −15° C.

In a control experiment 3.1. the hydrate forming mixture of water/ethane/ "SHELLSOL D60" as described above, without further additives, was fed to the apparatus.

In further experiments 3.2., 3.3 and 3.4, not according to this invention, there were respectively added to the hydrate forming medium, based on the water, 7 wt % of sodium chloride and 0.1 or 0.2 wt % of "GAFFIX COPOLYMER VC-713", a terpolymer of N-vinylpyrrolidone, N-vinylcaprolactam and dimethylaminoethylmethacrylic acid marketed by ISP CORPORATION, Wayne, N.J., USA.

In yet further experiments, 3.5.–3.12., one or two of three alkylated compounds according to the invention was added to the hydrate forming medium, with and without concurrent addition of sodium chloride or "GAFFIX".

The alkylated compounds tested were tetrapentylammoniumbromide (TPAB), tributylhexadecylphosphoniumbromide (TBHPB) and tributyldecyammonium-bromide (TBDAB).

In all experiments, the temperature at which there occurred an increase of 0.01 kPa in the pressure drop over the length of the pipe, and the temperature at which the flow in the pipe stopped entirely, (blocking temperature) were noted. When no pressure drop could be noted, the system was cooled down to a preset set temperature of 1° C. (Ex. 9), minus 1° C. (Ex. 10), minus 3.5° C. (Ex. 11) and 0° C. (Ex. 12), and circulation maintained for a maximum of 11, 100, 125 and 70 hours respectively.

The results are presented in Table 2.

TABLE 2

| Exp. nbr. | Additives and Concentrations (wt % based on water) | Temperature at which Blocking pressure drop starts to increase (Deg. C.) | temperature (Deg. C.) |
|---|---|---|---|
| 3.1. | no additives | 8.3 | 7.3 |
| 3.2. | 7.0% NaCl | 6.4 | 5.4 |
| 3.3. | 0.1% "GAFFIX" | 6.0 | 4.4 |
| 3.4. | 0.2 "GAFFIX" | 4.6 | 3.2 |
| 3.5. | 0.1% TPAB | 8.3 | 7.3 |
| 3.6. | 0.2% TPAB | 8.5 | 7.9 |
| 3.7. | 0.1% "GAFFIX" & 0.1% TPAB | 3.7 | 2.2 |
| 3.8. | 0.1% "GAFFIX" & 0.2% TPAB | 3.9 | 2.4 |
| 3.9. | 0.2% "GAFFIX" & 0.2% TPAB | <1.0[1] | <1.0[1] |
| 3.10. | 7.0% NaCl & 0.45% TBHPB | <–1.0[2] | <–1.0[2] |
| 3.11. | 7.0% NaCl & 0.45% TBHPB | <±3.5[3] | <–3.5[3] |
| 3.12. | 0.1% TBHPB 0.3% TBDAB | 0.0[4] | 0.0[4] |

1) In experiment 3.9. the loop was cooled at a rate of 1° C. per hour until a temperature of 1.0° C. was reached. Thereafter the loop was maintained at this temperature for another 11 hours. Then the experiment was terminated without any increase in pressure drop having been observed.

2) In experiment 3.10. the loop was cooled at a rate of 1° C. per hour until a temperature of minus 1° C. was reached. Thereafter the loop was maintained at this temperature for another 100 hours. Then the experiment was terminated without any increase in pressure drop having been observed.

3) In experiment 3.11. the loop was cooled at a rate of 1° C. per hour until a temperature of minus 3.5° C. was reached. Thereafter the loop was maintained at this temperature for another 125 hours during which a slight increase in the pressure drop over the loop was observed. Next, the circulation of the loop contents was stopped during a period of 125 hours whilst the temperature was kept constant at –3.5° C. Thereafter, a restart appeared to be possible without any additional increase of pressure drop.

4) In experiment 3.12. the loop was cooled at a rate of 1° C. per hour until a temperature of 0° C. was reached. Thereafter the loop was maintained at this temperature for 70 hours after which the pipeline blocked.

Experiments 3.5 and 3.6 did not demonstrate an improvement over the no-additive base case, experiment 3.1, because the additives were not present in a sufficient concentration. Experiments 3.7 through 3.12 are all within the scope of the present invention.

We claim:

1. A method for inhibiting the plugging of a conduit, the conduit containing a flowing mixture comprising an amount of hydrocarbons having from one to five carbons and an amount of water wherein the amounts of hydrocarbons and water are sufficent to form hydrates at conduit temperatures and pressures, the method comprising the steps of:

adding to the mixture an amount of a hydrate formation inhibitor component of the formula

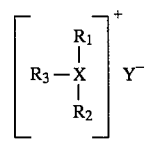

wherein $R_1$, $R_2$, and $R_3$ are independently chosen from the group consisting of normal and branched alkyls each having from 4 to 6 carbon atoms, and X is N—$R_4$, wherein $R_4$ is selected from the group consisting of hydrogen and organic substituents and $Y^-$ is an anion, the amount effective to inhibit formation of hydrates in the mixture at conduit temperatures and pressures; and flowing the mixture containing the hydrate formation inhibitor through the conduit.

2. The method of claim 1 wherein $R_4$ is selected from the group consisting of alkyls, alkenyls, aryls, arylalkyls, arylalkenyls, alkylaryls, alkenylaryls and glycols.

3. The method of claim 2 wherein $R_4$ is an alkyl having from eight to twenty carbon atoms.

4. The method of claim 3 wherein $R_4$ is oleyl.

5. The method of claim 2 wherein $R_4$ is an alkenyl having from eight to twenty carbon atoms.

6. The method of claim 2 wherein the $R_4$ comprises from one to twenty carbon atoms.

7. The method of claim 1 wherein the $R_4$ groups link the hydrate formation inhibitor to a polymer.

8. The method of claim 1 wherein $R_1$, $R_2$, and $R_3$ are each independently chosen from the group consisting of n-butyl, isopentyl and n-pentyl.

9. The method of claim 8 wherein the hydrate formation inhibitor cation is selected from the group consisting of tributyldecylammonium, tripentyldecylammonium, tributyloleylammonium, and tributylhexadecylammonium.

10. The method of claim 1 wherein Y is selected from the group consisting of hydroxide, carboxylate, halide, sulphate, and organic sulphonate.

11. The method of claim 1 wherein the amount of the hydrate formation inhibitor is between 0.05 and 5 percent by weight based on the water in the mixture.

12. The method of claim 1 wherein the amount of the hydrate formation inhibitor is between about 0.1 and 0.5 percent by weight of the water in the mixture.

13. The method of claim 1 wherein $R_1$, $R_2$, and $R_3$ are each independently chosen from the group consisting of n-butyl, iso-pentyl and n-pentyl.

14. The method of claim 4 wherein the amount of the hydrate formation inhibitor is between 0.05 and 5 percent by weight based on the water in the mixture.

* * * * *